(12) United States Patent
Hara

(10) Patent No.: US 6,899,268 B2
(45) Date of Patent: May 31, 2005

(54) ELECTRONIC LOCKER SYSTEM

(75) Inventor: Kouichiro Hara, Tokyo (JP)

(73) Assignee: Kabushiki Kaisha Fulltime System, Tokyo (JP)

(*) Notice: Subject to any disclaimer, the term of this patent is extended or adjusted under 35 U.S.C. 154(b) by 238 days.

(21) Appl. No.: 09/942,582

(22) Filed: Aug. 31, 2001

(65) Prior Publication Data

US 2002/0027160 A1 Mar. 7, 2002

(30) Foreign Application Priority Data

Sep. 4, 2000 (JP) .................................. P2000-266912
Nov. 2, 2000 (JP) .................................. P2000-335986

(51) Int. Cl.⁷ .............................................. G06K 5/00
(52) U.S. Cl. ................... 235/382; 235/381; 235/383; 235/375; 340/5.73; 340/5.81; 705/5
(58) Field of Search ............................. 235/375, 379, 235/382, 382.5, 383, 381, 380; 705/5, 418; 340/5.73, 5.81

(56) References Cited

U.S. PATENT DOCUMENTS

| | | | | |
|---|---|---|---|---|
| 4,857,714 A | * | 8/1989 | Sunyich | 235/382 |
| 4,894,717 A | | 1/1990 | Komei | 358/108 |
| 5,126,732 A | * | 6/1992 | Mardon | 340/5.33 |
| 5,212,644 A | * | 5/1993 | Frisch | 705/418 |
| 5,223,829 A | * | 6/1993 | Watabe | 340/5.73 |
| 5,231,272 A | * | 7/1993 | Mardon | 235/382 |
| 5,946,660 A | * | 8/1999 | McCarty et al. | 705/5 |
| 6,010,064 A | * | 1/2000 | Umeda et al. | 235/375 |
| 6,230,971 B1 | * | 5/2001 | Matsumoto et al. | 235/380 |
| 6,367,696 B1 | * | 4/2002 | Inamitsu et al. | 235/381 |

FOREIGN PATENT DOCUMENTS

JP         9-330458         12/1997

* cited by examiner

Primary Examiner—Michael G. Lee
Assistant Examiner—Ahshik Kim
(74) Attorney, Agent, or Firm—Armstrong, Kratz, Quintos, Hanson & Brooks, LLP.

(57) ABSTRACT

An electronic locker system which is provided with: a locker for housing luggage; a reading means for electrically reading a depositor identifier that has been preliminarily determined by a contract between a managing company of the locker and a user of the locker; an electronic lock for locking the door of the locker after luggage has been deposited in the locker; and a central control unit which, based upon the depositor identifier read by the reading means, sends information of the corresponding depositor to a locker managing center through a communication line, and when, at the time of taking out the luggage, the read depositor identifier has been identified, releases the electric lock and sends necessary information such as a luggage deposit fee to the locker managing center through the communication line, and in this arrangement, the luggage depositing process and luggage taking-out process to and from the locker are carried out based upon only the depositor identifier. Thus, it is possible to provide an electronic locker system which can eliminate the need for any key that has been used for locking and unlocking the conventional coin locker, and automatically settle the bill for the use of the locker by using a credit card, etc., through a communication line.

7 Claims, 5 Drawing Sheets

[FIG. 1]
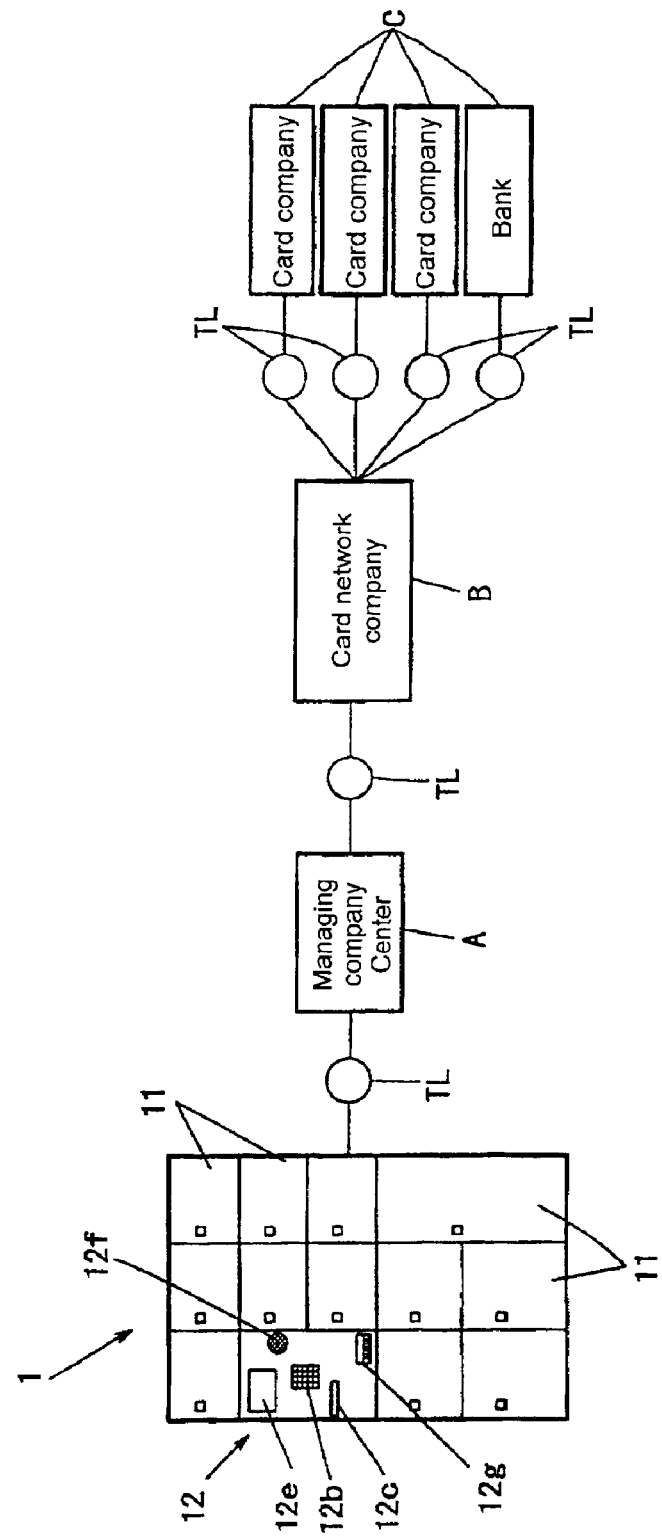

[FIG. 2]
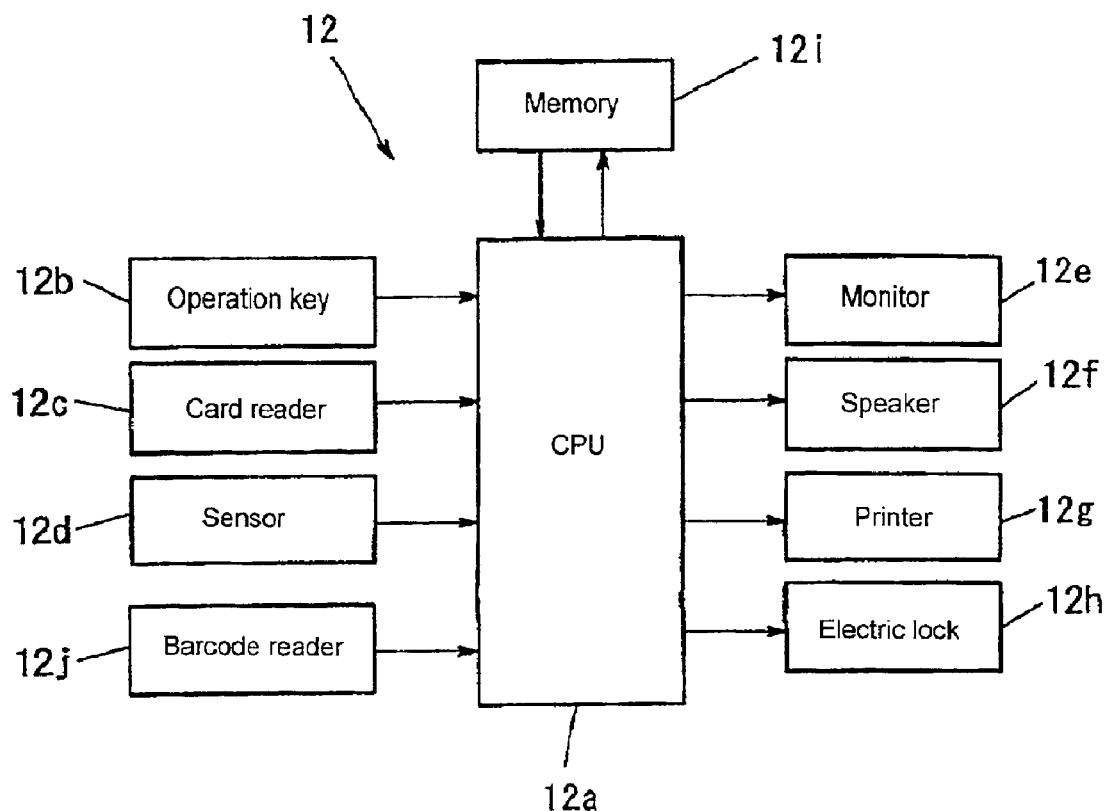

[FIG. 3]
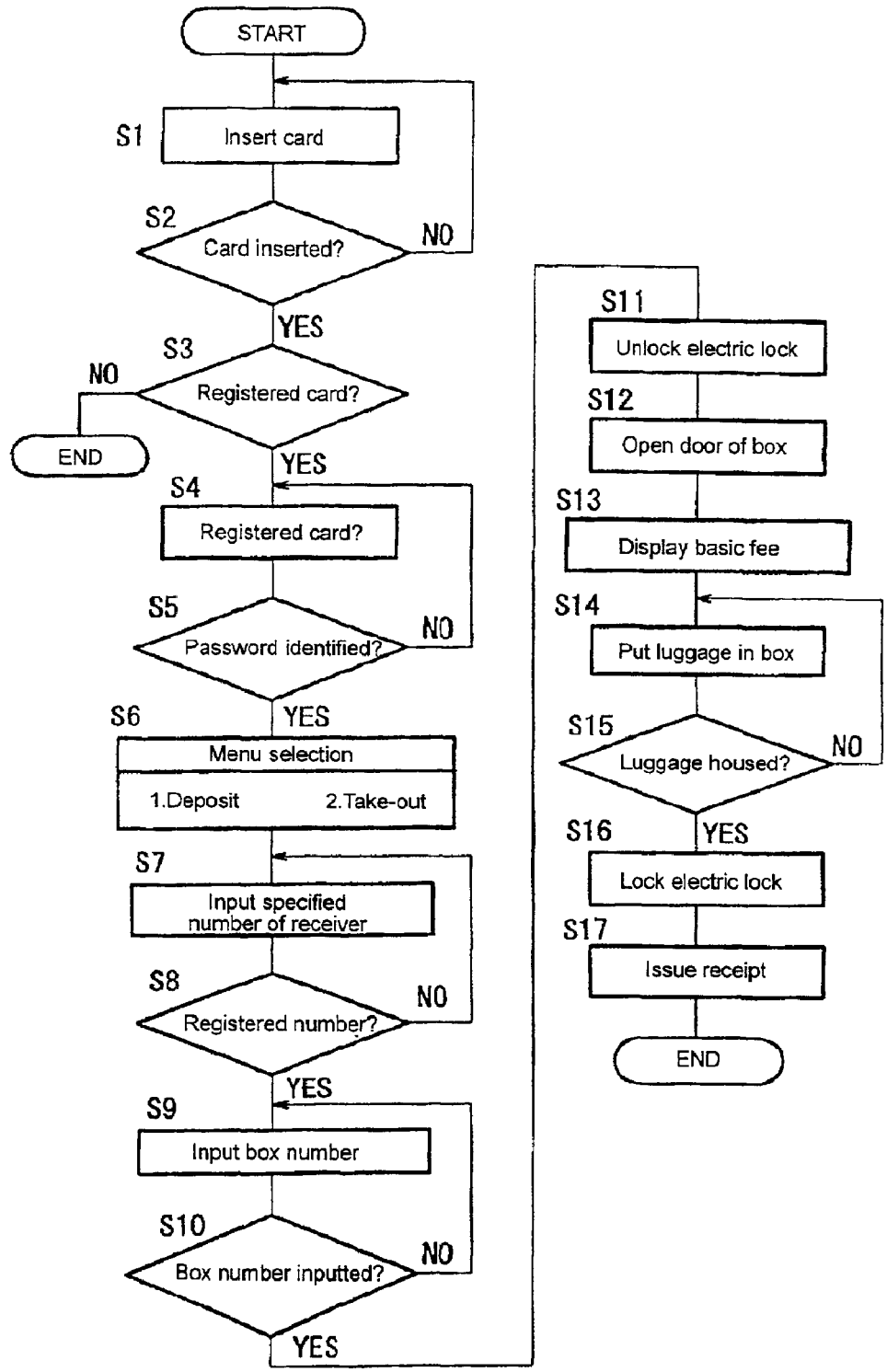

[FIG. 4]
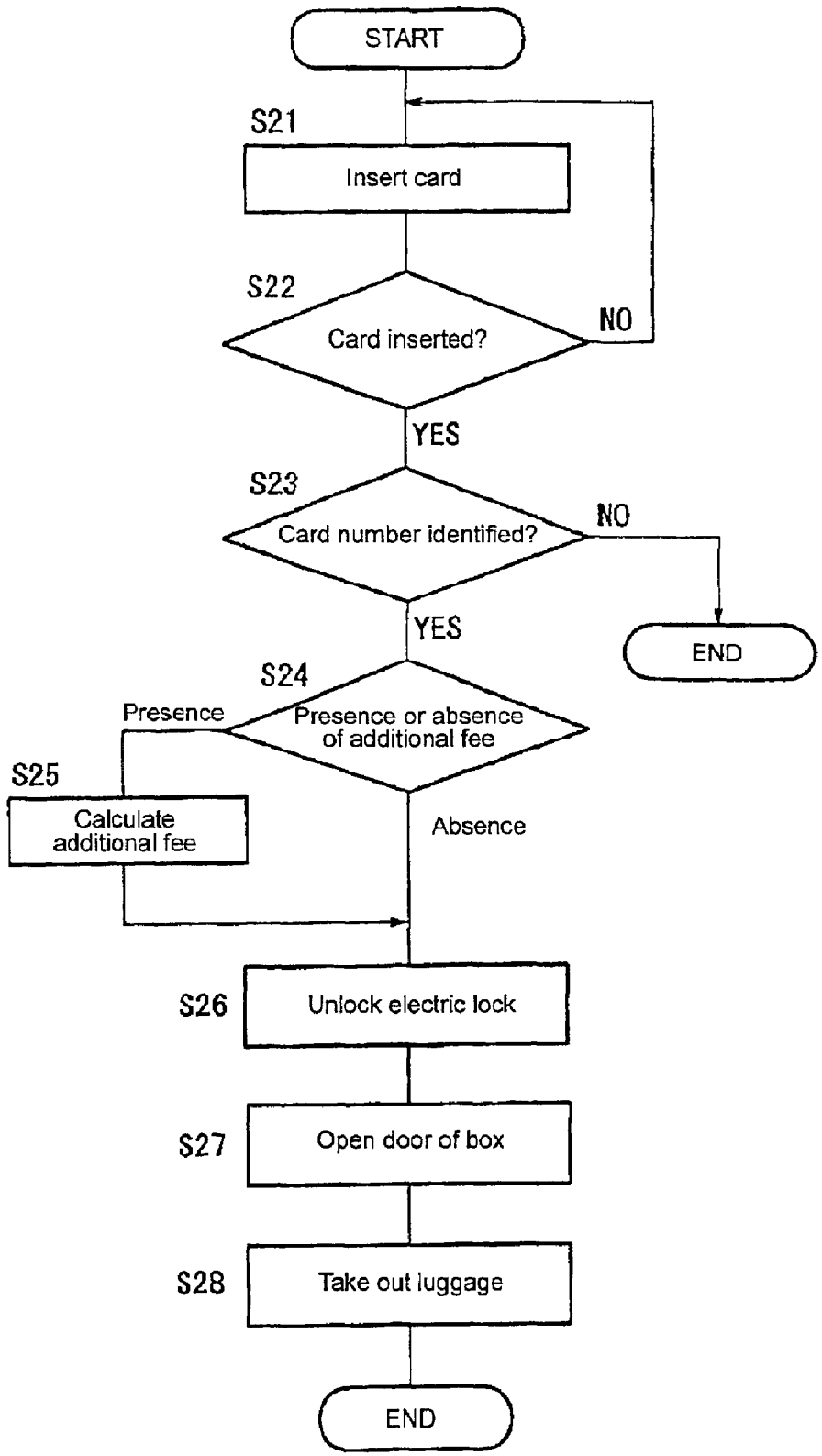

[FIG. 5]
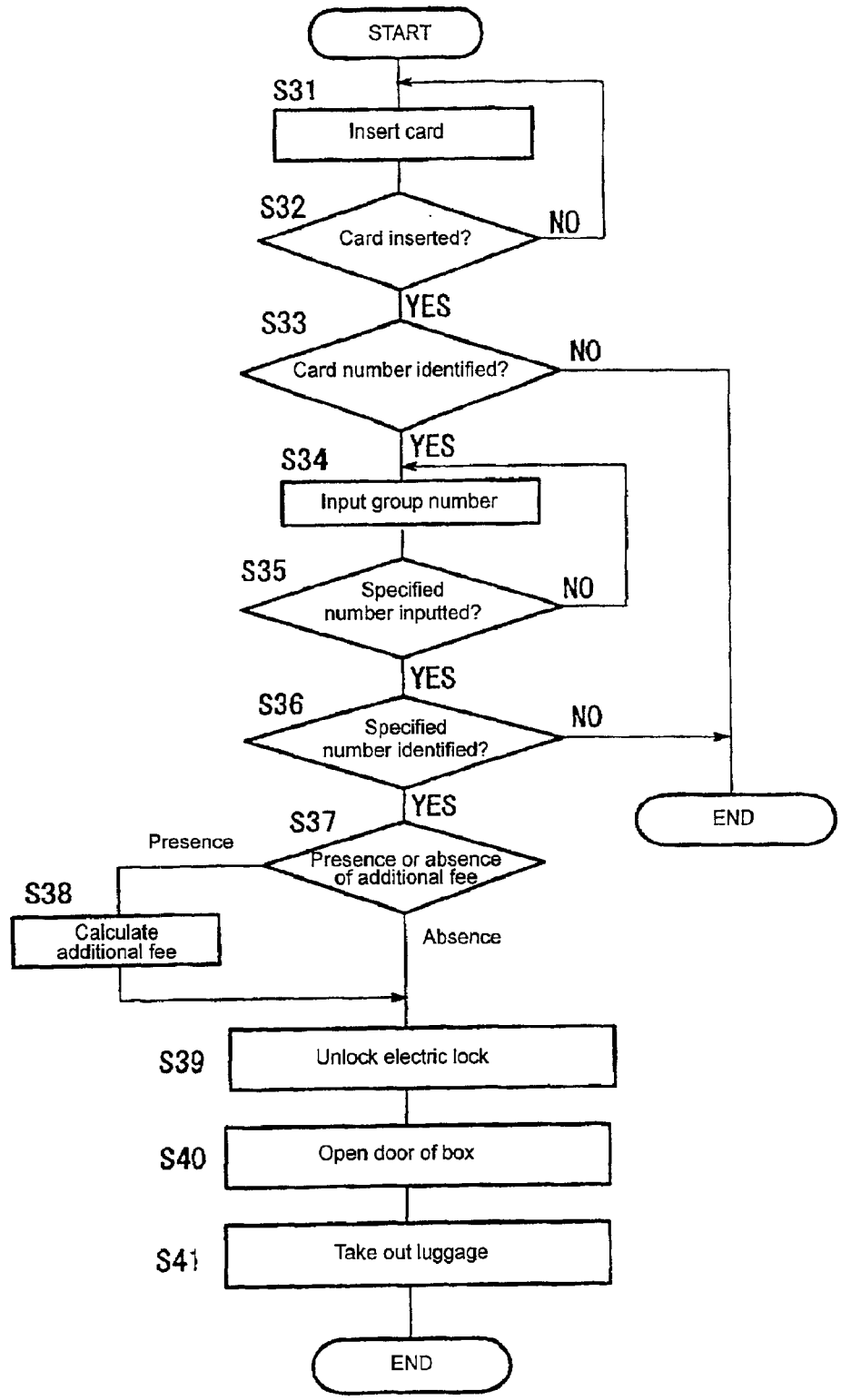

ELECTRONIC LOCKER SYSTEM

BACKGROUND OF THE INVENTION

1. Field of the Invention

The present invention relates to a locker system used for depositing luggage, placed in a station, a sleeping accommodation, or the like, and more specifically, relates to an electronic locker system which makes it possible to eliminate the need for keys used for locking and opening doors of conventional lockers, and also to automatically settle the payment of the luggage deposit fee by a credit card, etc., through a communication line.

2. Description of the Related Art

In a luggage depositing coin locker that has been conventionally used, luggage is deposited in an empty locker, and the door is closed, and after having put a basic fee corresponding to one-day use through a fee inserting slot attached at a locking section, the key is used for locking the locker; thus, after locking the locker, the depositor carries the key, and at the time of taking out the luggage, the depositor uses the key to open the locker and takes the luggage out.

However, in the above-mentioned coin locker, since a cash payment is made by coins, it is not possible to use the locker without coins. Moreover, since it is not possible to open the locker without the key of the locker containing the luggage, a person who has the key has to go to the site where a cabinet of the coin locker is located when the luggage is taken out. For this reason, for example, in the case when the user who has deposited luggage in a coin locker wants another person to open the locker and receive the luggage, the user needs to pass the key to the person beforehand; this results in a troublesome task in using these coin lockers.

Moreover, in the conventional coin locker, normally, an additional fee is calculated and charged on one-day basis with 0:00 a.m. in midnight being the border; therefore, it has not been possible to carry out fine time management. For this reason, for example, in the case when luggage is deposited at 11:55 p.m. and then taken out at 0:05 a.m., a two-day fee has to be paid for just 10 minutes' deposit of the luggage, which is an unreasonable situation.

Moreover, in the conventional coin locker, since any one can freely put and take out luggage in and from the locker, a wicked person might put a dangerous object in the locker, resulting in a problem with security in managing coin lockers.

SUMMARY OF THE INVENTION

The present invention has been devised to solve the above-mentioned problems, and it therefore is an object of the present invention to provide an electronic locker system in which the depositing process and taking-out process of luggage is freely carried out without using keys by allowing a card reader attached to the locker cabinet to read a card such as a credit card, an electronic card and a debit card, the fee for the use of the locker can be automatically settled through a credit card, etc., via a communication line, and a substantial fee calculated based upon an actual lapse of time can be charged.

In order to achieve the above-mentioned object, an electronic locker system according to one aspect of the present invention is provided with: a reading means for electrically reading a depositor identifier that has been preliminarily determined by a contract between a managing company of the locker and a user of the locker; an electronic lock for locking the door of the locker after luggage has been deposited in the locker; and a central control unit which, based upon the depositor identifier read by the reading means, sends information of the corresponding depositor to a locker managing center through a communication line, and when, at the time of taking out the luggage, the read depositor identifier has been identified, opens the electric lock and sends necessary information such as a luggage deposit fee to the locker managing center through the communication line, and in this arrangement, the luggage depositing process and luggage taking-out process to and from the locker are carried out based upon only the depositor identifier. Moreover, the luggage deposit fee is automatically drawn from the account of the depositor based upon the depositor identifier that has been determined by the contract between the managing company and the user of the locker.

An electronic locker system according to another aspect of the present invention is provided with: a locker for housing luggage; a reading means for electrically reading a depositor identifier and a receiver identifier that have been preliminarily determined by a contract between a managing company of the locker system and a user of the locker; operation keys through which a luggage receiver inputs a specific number such as a member identification number, etc.; an electronic lock for locking the door of the locker after luggage has been deposited in the locker; and a central control unit which, based upon the depositor identifier and the receiver identifier read by the reading means, sends information of the corresponding depositor and receiver to a locker managing center through a communication line, and when a read receiver identifier has been confirmed as the identifier of the corresponding luggage receiver, opens the electric lock and sends necessary information such as a luggage deposit fee to the locker managing center through the communication line, and in this arrangement, the luggage depositing process and luggage taking-out process to and from the locker are carried out based upon only the identifier.

Moreover, according to still another aspect of the present invention, only a designated individual within a registered group specified by the specific number is allowed to receive the luggage. Alternatively, any one of users of a registered group specified by the specific number is allowed to receive the luggage.

Furthermore, in these arrangements, the luggage deposit fee is automatically drawn from the account of the depositor based upon the depositor identifier and the receiver identifier that have been preliminarily determined by the contract between the managing company and the user of the locker.

Here, the luggage deposit fee is calculated based upon an actual lapse of time from the depositing process to the taking-out process.

BRIEF DESCRIPTION OF THE DRAWINGS

FIG. 1 is a block diagram that shows the entire construction of an electronic locker system in accordance with a preferred embodiment;

FIG. 2 is a block diagram of an electric circuit of a control box installed in the locker;

FIG. 3 is a flow chart that shows the procedure for depositing luggage;

FIG. 4 is a flow chart that shows the receiving process in which only a designated person can receive the luggage; and FIG. 5 is a flow chart that shows a receiving process in which any one individual within a registered group can take receipt the luggage.

DESCRIPTION OF THE PREFERRED EMBODIMENTS

The preferred embodiments of an electronic locker system in accordance with the present invention are described below with reference to the Figures. FIGS. 1 and 2 show a first preferred embodiment of the present invention. FIG. 1 is a block diagram that shows the entire structure of an electronic locker system in accordance with the present preferred embodiment, and FIG. 2 is a block diagram showing an electrical circuit of a control box installed in the locker cabinet.

In FIG. 1, reference numeral 1 is an electronic locking type locker cabinet that is placed in a railroad station building, etc., and this locker 1 is provided with a plurality of lockers 11 having different sizes and a control box 12 which is operated by the user upon depositing and taking out luggage. This control box 12 has an arrangement shown in FIG. 2.

In other words, it is provided with a central control unit (CPU) 12a, and following parts and members are connected to the central control unit 12a: operation keys 12b including ten keys, a cancel key, a start key, etc., a card reader 12c for reading a card such as a credit card, an electronic card and a debit card, a sensor 12d for detecting the facts that any luggage is put into the locker 11 and taken out therefrom, a monitor 12e for displaying a sequence of operations, etc., a speaker 12f used for communicating with the managing center A and for explaining the sequence of operations by voice, a printer 12g for printing and issuing a receipt for the luggage, and an electronic lock 12h for locking and unlocking the locker 11.

Now, back to FIG. 1, reference symbol A is a managing center of a managing company for carrying out management on the locker cabinet 1, which is connected to the central control unit 12a of the locker cabinet 1 through a communication line TL such as a public line or a private telephone line, B is a card network company connected to the managing center A through a communication line TL, which, in the case when a card, such as a credit card, an electronic card or a debit card, is lost or stolen, issues a notice of invalidity of the card to affiliation stores for the card, and also checks to inspect any fraudulent use of the card each time the card is used, and C is each of various credit card companies and banks that are connected to the card network company B through communication lines TL.

Next, an explanation will be given of a process for depositing and taking out luggage in and from the locker 1 in accordance with the above-mentioned arrangement. The following description will exemplify a case in which a credit card is used for depositing and taking out luggage; however, another card, such as an electronic card and a debit card, can be used in the same manner.

First, referring to FIG. 3, an explanation will be given of a process for depositing luggage.

Here, it is assumed that prior to using the electronic locker of the present invention, the user of the locker 1 has preliminarily registered his or her membership in a managing company for operating the managing center A by giving necessary information such as the number of his or her credit card and the telephone number thereto, and received necessary information required for using the locker, such as a member number (the cellular phone number, etc., may be used) that is a specific number and a pass word. Moreover, upon registering the membership, a plurality of users forming a group may have a group membership; thus, as will be explained later, not only a designated individual, but also any one within the group can receive the luggage in question.

Upon depositing luggage in the locker 1, the user inserts a credit card obtained by registering the membership into the card reader 12c of the control box 12 so as to allow it to read the card (step S1 in FIG. 3). The central control unit 12a makes a determination as to whether or not a card has been inserted (step S2), and in the case when a card has been inserted, makes a determination as to whether or not the card is a credit card owned by the registered member (step S3).

When it is determined that the card is owned by the registered member (YES side at step S3), the monitor 12e displays a message for requesting an input of the password. In response to this, when the user inputs a password (step S4), the central control unit 12a makes a determination as to whether or not the password is valid (step S5), and if it is valid, allows the monitor 12e to display a menu selection screen (for example, "1. Deposit 2. Receive", etc.) (step S6). Moreover, guiding voice is given through the speaker 12f, if necessary.

When the user pushes a digit button "1" of the operation keys 12b following the display, the system is set to a deposit mode so that the monitor 12e displays a message for requesting an input of a specific number of the receiver of the luggage to be deposited. In accordance with this display, the user inputs the specific number of the receiver of the luggage through the operation keys 12e (step S7).

Additionally, with respect to the specific number, the member's number of the registered member, the telephone number, such as the home telephone number and the cellular phone number, of the registered member preliminarily given to the managing company, and the group number that has been registered as described above may be used. In the case when the member's number or the telephone number of the registered member is inputted as the specific number, no one can open the locker and receive the luggage thus deposited, except for the specified receiver corresponding to the member number or the telephone number. On the other hand, in the case when the group number is inputted as the specific number, any one within the specified group can open the locker and receive the luggage.

The central control unit 12a determines whether or not the specific number thus inputted is registered one (step S8), and in the case when it is a registered specific number, allows the monitor 12e to display a message for requesting an input of a box number to be used. Following this display, the user selects an empty locker 11 suitable for the size of the luggage to be deposited, and inputs the number of this locker (step S9).

The central control unit 12a makes a determination as to whether or not the inputted box number corresponds to the number of an empty box (step S10), and when the number corresponds to the number of an empty locker, unlocks the electric lock 12h of the empty box 12 (step S11) to open the door of the box (step S12); thus, it allows the sensor 12d to start detecting the presence or absence of any luggage placed in the box, and also allows the monitor 12e to display a basic fee (one-day fee) for using the box (step S13). In general, the locker cabinet 1 is provided with lockers 11 having several kinds of sizes, and the basic fee is different depending on the sizes of the lockers 11 to be used, for example, 300 yen, 500 yen, etc.

When the user puts luggage in the locker in this state (step S14), the central control unit 12a monitors whether or not any luggage is housed in the locker, that is, whether or not the sensor 12d has detected the luggage (step S15), and in the case when it is determined that the luggage has been housed (YES side at step S15), after having locked the door by activating the electric lock 12h (step S16), it operates the printer 12 to issue a receipt on which the name of the luggage depositor, the time and day of the deposit, the location of the locker cabinet, the locker number, the basic fee of the locker, etc. are printed (step S17). All these data are stored in a memory 12i, and the time elapsed after the deposit is counted from the point of time at which the electric lock 12h has been locked.

When the receipt has been issued as described above and the counting of the elapsed time has been started, the central control unit 12a transmits the various data stored in the memory 12i to the managing center A through the communication line TL, and these data are stored in a computer inside the managing center A. After the above-mentioned processes, the luggage depositing operation is completed.

Next, an explanation will be given of a process for taking out the luggage deposited as described above.

First, referring to FIG. 4, an explanation will be given of a case in which only the specified receiver can receive the luggage. This case that allows only the specified receiver to receive the luggage corresponds to the case in which in the depositing operation shown in FIG. 3, at step S7, the member's number or the telephone number of an individual registered member has been inputted as the specific number of the receiver.

The aforementioned depositor of the luggage informs the specified receiver of the luggage of the fact that the luggage has been deposited in a locker of the locker cabinet in a railroad station building by using a proper means such as telephone or an E-mail.

The receiver, who has got the information, goes to the location of the locker cabinet set in the railroad station that has been informed of, and inserts his or her own credit card obtained by registering his or her membership into the card reader 12c of the control box 12 of the locker 1 cabinet, and allows it to read the card (step S21 in FIG. 4). The central control unit 12a makes a determination as to whether or not any card has been inserted (step S22), and when a card has been inserted, determines whether or not the number of the card is coincident with the card number of the specified receiver (step S23).

If it is determined that the numbers are coincident with each other (YES side at step S23), the central control unit 12a makes a determination as to whether or not the elapsed time has exceeded a deposit time available for the basic fee (in this example, 24 hours) based upon the elapsed time from the time of the deposition to the present time (step S24).

If this has not exceeded the time ("Absent" side at step S24), the sequence proceeds to step S26. In contrast, in the case when this has exceeded the deposit time available for the basic fee ("Present" side at step S24), after calculating an additional fee corresponding to the over time (step S25), the sequence proceeds to step S26. In this manner, it is possible to add an additional fee corresponding to the elapsed time during which the luggage has been deposited actually, and consequently to eliminate such an unreasonable situation in the conventional coin locker in which an additional fee is added at the time when it has passed 0:00 a.m.

When the sequence has proceeded to step S26, the central control unit 12a unlocks the electric locker 12h, and opens the door of the locker 11 corresponding to the luggage deposit number (step S27). Then, the receiver takes out the luggage housed in the locker 11 (step S28). In this manner, different from the conventional locker, a person other than the person who has deposited the luggage can open the locker and take out the luggage without using any key.

After the luggage has been taken out as described above, the central control unit 12a transmits the fee information to the managing center A together with the taking-out information stored in the memory 12i. The managing center A transmits the corresponding bill addressed to the depositor of the luggage to the card network company B through the communication line TL based upon the fee information sent thereto.

The card network company B transmits the bill sent thereto to the corresponding credit company C through the communication line TL so that the basic fee and the additional fee are drawn through the credit card of the user who deposited the luggage, thereby making it possible to automatically settle the bill for the use of the locker. Thus, all the taking-out operations of the luggage are completed.

Here, in the above-mentioned example of the operations, the additional fee for the deposit is also drawn through the credit card of the user who deposited the luggage; however, it may be arranged so that the additional fee is drawn through the credit card of the receiver of the luggage. In other words, after the calculation of the additional fee at step S25, this fee may be displayed on the monitor 12e, and may also be settled by the credit card that has been inserted in the card reader 12c.

Next, referring to FIG. 5, an explanation will be given of a case in which any one within the registered group can receive the luggage. This case that allows any one within the registered group can receive the luggage corresponds to the case in which in the depositing operation shown in FIG. 3, at step S7, the number of a registered group has been inputted as the specific number of the receiver.

The aforementioned depositor of the luggage informs any one of the specified group or all the member of the specified group of the fact that the luggage has been deposited in a locker cabinet set in a railroad station building by using a proper means such as telephone or an E-mail.

Any one of the group, who has got the information, goes to the location of the locker within the said railroad station that has been informed of, and inserts his or her own credit card that has been group-registered into the card reader 12c of the control box 12 of the locker cabinet 1, and allows it to read the card (step S31 in FIG. 5). The central control unit 12a makes a determination as to whether or not any card has been inserted (step S32), and when a card has been inserted, determines whether or not the number of the card is coincident with the card number within the specified group (step S33).

If it is determined that the numbers are coincident with each other (YES side at step S33), the central control unit 12a allows the monitor 12e to display a message requesting for an input of a group number. In response to this, when the user inputs a group number (step S34, S35), the central control unit 12a determines whether or not the inputted number is coincident with the specified group number (step S36), and if it is coincident, makes a determination as to whether or not the elapsed time has exceeded a deposit time available for the basic fee based upon the elapsed time from the time of the deposition to the present time (step S37).

If this has not exceeded the time ("Absence" side at step S37), the sequence proceeds to step S39. In contrast, in the case when this has exceeded the deposit time available for the basic fee ("Presence" side at step S37), after calculating an additional fee corresponding to the over time (step S38), the sequence proceeds to step S39.

When the sequence has proceeded to step S39, the central control unit 12a unlocks the electric locker 12h, and opens the door of the locker 11 corresponding to the luggage deposit number (step S40). Then, the receiver takes out the luggage housed in the locker 11 (step S41). In this manner, different from the conventional coin locker, any one within the group can open the locker and take out the luggage without using any key.

After the luggage has been taken out as described above, the central control unit 12a transmits the fee information to the managing center A together with the taking-out information stored in the memory 12i. The managing center A transmits the corresponding bill addressed to the depositor of the luggage to the card network company B through the communication line TL based upon the fee information sent thereto.

The card network company B transmits the bill sent thereto to the corresponding credit company C so that the basic fee and the additional fee are drawn through the credit card of the user who deposited the luggage, thereby making it possible to automatically settle the bill for the use of the locker. Thus, all the taking-out operations of the luggage are completed. In this case also, the additional fee may be drawn through the credit card of the receiver of the luggage.

Here, in the above-mentioned preferred embodiments, the explanations have been given of a case in which the locker cabinet 1 is placed in a railroad station building; however, the installation place of the locker cabinet 1 is not intended to be limited by this, and it may be installed at any place that requires lockers, such as sleeping accommodations.

Moreover, in the above-mentioned preferred embodiments, the explanations have been given of a case in which a card is used while utilizing the depositor identifier and the receiver identifier; however, a barcode, supplied from a managing company, may be used with a barcode reader being utilized in place of the card reader 12c. In this case, the bill for the use of the locker may be sent to the depositor or the receiver from the managing company that has read the barcode.

Furthermore, in the above-mentioned preferred embodiments, the explanations have been given of a case in which the depositor and the receiver are different; however, the same usage as the conventional coin locker, that is, the usage in which the same person that deposited luggage takes out the luggage as the receiver, may of course be carried out. In this case, however, the usage is distinct from the conventional coin locker in that only the fee corresponding the actual time of use is charged.

As described above, in accordance with the electronic locker system of the present invention, the luggage deposit fee can be calculated based upon an actual lapse of time from the deposit of luggage to the taking-out thereof; therefore, it is possible to carry out a precise time management, and consequently to eliminate the unreasonable situation in which a fee corresponding to a plurality of days is charged with respect to only the deposit for few hours.

Moreover, since the bill of the use of the locker is settled through a card or a barcode supplied by a managing company, it is possible to use the locker without any coin. Moreover, different from the conventional coin locker, upon taking out the luggage, it is possible to eliminate the situation in which a person who carries the key with him or her needs to go to the location of the locker, and also to allow a person other than the depositor of the luggage in the locker to open the locker and take out the luggage.

Furthermore, an arrangement is made so that only the designated individual specified by the specific number can receive the luggage, or so that any one within the registered group of users specified by the specific number can receive the luggage.

Since only the registered members in a managing company are allowed to use the lockers, it is possible to sufficiently ensure the security in the locker management.

What is claimed is:

1. An electronic locker system comprising:
   a locker for housing luggage;
   a reading means for electrically reading a depositor identifier that has been preliminarily determined by a contract between a managing company of the locker and a user of the locker;
   an electronic lock for locking the door of the locker after luggage has been deposited therein; and
   a central control unit which, when said reading means reads said depositor identifier preliminarily determined by the contract between the managing company of the locker and the user of the locker, and when, the depositor identifier read by said reading means is identified as said depositor identifier preliminarily determined by the contract, releases the electric lock to allow the door of the locker to open and sends necessary information such as a luggage deposit fee to the locker managing center through the communication line;
   wherein the user is only able to deposit luggage into the locker after said central control unit performs the releasing of the electric lock.

2. The electronic locker system according to claim 1, wherein the luggage deposit fee is automatically drawn from the account of the depositor based upon the depositor identifier that has been determined by the contract between the managing company and the user of the locker.

3. An electronic locker system comprising:
   a locker for housing luggage;
   a reading means for electrically reading a depositor identifier and a receiver identifier that have been preliminarily determined by a contract between a managing company of the locker and a user of the locker;
   operation keys through which a luggage depositor and a luggage receiver input a specific number such as a member identification number;
   an electronic lock for locking a door of the locker; and
   a central control unit which, based upon a read depositor identifier and receiver identifier read by the reading means, and when the read receiver identifier or depositor identifier have been identified as said depositor identifier or said receiver identifier preliminarily determined by the contract between managing company and the user, opens the electronic lock to allow the door of the locker to open and sends necessary information such as a luggage deposit fee to the locker managing center through the communication line;
   wherein the user is only able to deposit luggage into the locker after said central control unit performs the opening of the electronic lock.

4. The electronic locker system according to claim 3, wherein only a designated individual within a registered group specified by a specific number is allowed to be the luggage receiver who receives the luggage.

5. The electronic locker system according to claim 3, wherein any one of users of a registered group specified by a specific number is allowed to be the luggage receiver who receives the luggage.

6. The electronic locker system according to any one of claims 3 to 5, wherein the luggage deposit fee is automatically drawn from the account of the depositor based upon the depositor identifier and the receiver identifier that have been determined by the contract between the managing company and the user of the locker.

7. The electronic locker system according to any one of claims 1 to 5, wherein the luggage deposit fee is calculated based upon an actual lapse of time from the depositing process to the taking-out process.

* * * * *